United States Patent [19]
Lenoble et al.

[11] Patent Number: 5,094,809
[45] Date of Patent: Mar. 10, 1992

[54] DEVICE FOR THE OBTURATION AND RETENTION OF A SEALED CLOSURE PLUG OF A STEAM GENERATOR TUBE

[75] Inventors: Richard Lenoble, Lyons; Jean Paul Billoue, Chapet Les Mureaux, both of France

[73] Assignee: Framatome, Courbevoie, France

[21] Appl. No.: 541,722

[22] Filed: Jun. 21, 1990

[30] Foreign Application Priority Data

Jun. 23, 1989 [FR] France ............... 89 08412
Sep. 29, 1989 [FR] France ............... 89 12790

[51] Int. Cl.$^5$ .............................. G21C 13/00
[52] U.S. Cl. ........................ 376/206; 376/203
[58] Field of Search ........... 376/203, 206; 138/89, 138/160; 73/861.58

[56] References Cited

U.S. PATENT DOCUMENTS

| | | | |
|---|---|---|---|
| 3,802,466 | 4/1974 | Panella | 138/89 |
| 3,814,136 | 6/1974 | Johnson et al. | 138/89 |
| 3,842,612 | 10/1974 | Arnold | 138/89 |
| 4,436,117 | 3/1984 | Martin | 138/89 |
| 4,465,104 | 8/1984 | Wittman et al. | 138/89 |
| 4,751,944 | 6/1988 | Sinha et al. | 138/89 |
| 4,771,810 | 9/1988 | Ermold et al. | 138/89 |
| 4,784,561 | 11/1988 | Cartry et al. | 414/222 |
| 4,986,313 | 1/1991 | Mounet | 138/89 |
| 5,033,511 | 6/1991 | Cacciuttolo et al. | 138/97 |

FOREIGN PATENT DOCUMENTS

0044982 7/1981 European Pat. Off.
0319723 11/1988 European Pat. Off.
2599463 5/1987 France.

*Primary Examiner*—Brooks H. Hunt
*Assistant Examiner*—Meena Chelliah
*Attorney, Agent, or Firm*—Pollock, Vande Sande & Priddy

[57] ABSTRACT

The device comprises a threaded rod (11a) capable of being screwed into the threaded bore (10′) traversing the core (10) and solid, at one of its ends, with a blocking element (11b) the external diameter of which is greater that the diameter of the rod (11a) and which comes into engagement in that end (7) of the casing (4) of the plug (3) opposite the closure base (5) of the plug when the threaded rod (11a) is screwed into the core (10). The blocking element (11b) cooperates with the end of the casing (4) of the plug to achieve the blocking, against rotation and/or translation, of the obturating device (11). The threaded rod (11a) may comprise a transverse orifice in which a braking part is engaged.

19 Claims, 10 Drawing Sheets

DEVICE FOR THE OBTURATION AND RETENTION OF A SEALED CLOSURE PLUG OF A STEAM GENERATOR TUBE

FIELD OF THE INVENTION

The invention relates to a device for obturating and retaining a sealed closure plug of a steam generator tube, especially of a steam generator of a pressurized-water nuclear reactor.

BACKGROUND OF THE INVENTION

The steam generators of pressurized-water nuclear reactors comprise a casing of generally cylindrical shape, within which a water reservoir is delimited by a tube plate of great thickness, on which the bundle of tubes of the steam generator is fixed. Each one of the tubes of the bundle comprises two parallel rectilinear branches, the end parts of which are fixed within the tube plate, generally by rolling in and by welding.

In the steam generator in service, the tubes are in contact both with the primary fluid of the nuclear reactor constituted by pressurized water and with the secondary fluid constituted by feed water which vaporizes. Under the conditions of use of the steam generator, the tubes are liable to suffer various deteriorations and, in particular, corrosion by the fluids with which they are in contact. Certain tubes of the steam generator may become defective in service and exhibit, for example, cracks which give rise to leakages causing contamination of the secondary fluid.

It is therefore necessary, during the periods of maintenance of the reactor, to take action on the steam generator and to plug the tubes exhibiting deteriorations which are liable to involve leakages.

Plugs for obturating the tubes of a steam generator are known which comprise a casing of tubular form, closed at one of its ends by a base and a clamping core, which is likewise tubular, introduced into the bore of the casing of the plug in order to ensure the diametral expansion of the plug after its introduction into the tube of the steam generator.

The external wall of the casing of the plug comprises ribs projecting radially towards the exterior, over at least a part of its length. The clamping by the core is effected, in particular, in the zone of the casing of the plug comprising ribs which cooperate with the internal surface of the tube in order to ensure the blocking and the sealing of the plug.

The core remains in position within the casing of the plug in the course of the restoration to operation of the steam generator after maintenance, and ensures, in particular, the retention of the plug, the base of which is subjected on one side to the pressure prevailing within the tube of the steam generator and on the other side to the pressure of the primary water filling the water reservoir of the steam generator.

In the case of a tube of the steam generator exhibiting a leak, the pressure within the tube corresponds to the pressure of the feed water of the steam generator, this pressure being very much less than the primary pressure.

There is likewise carried out, before the starting up of the steam generators, the preventive plugging of certain tubes which run the risk of cracking rapidly and of producing undesirable leaks. In this case, the internal volume of the tube is filled with air which is isolated both from the primary water and from the feed water, and which is at a pressure very much lower than the primary pressure.

In all cases, the tubes of the steam generator are obturated at each one of their ends which open on either side of the partition of the water reservoir.

The casing of the plug is constructed of a nickel alloy which has undergone a heat treatment permitting the improvement of its resistance to corrosion and mechanical and thermal stresses, within the environment of the steam generator in service.

However, it has been observed that, after a certain time of operation of the steam generator, the casing of the plugs for obturating the tubes of the bundle of which the plugging has been carried out exhibits circumferential cracks, in particular in the zones situated just above and just below the expander core.

These cracks may lead to fractures of the plugs which are reflected in a loss of sealing of the end of the tube, so that the primary water is liable to penetrate within the tube.

Moreover, in the case orf a fracture above the expander core, the upper part of the plug comprising the sealed closure base is propelled violently within the tube under the effect of the difference between the primary pressure and the pressure prevailing within the tube. The upper part of the plug then behaves as a projectile liable to damage the tube of the corresponding steam generator, and the adjacent tubes of the bundle.

Until now, no device was known for limiting the leakages and preventing the risks of fracture and of high-speed ejection of the casings of the plugs for obturating the steam generator tubes of the pressurized-water nuclear reactors.

SUMMARY OF THE INVENTION

The object of the invention is a device for obturating and retaining a sealed closure plug of a steam generator tube comprising a casing of tubular shape closed at one of its ends by a sealed base engaged into one end of the tube, in such a manner that the base is disposed within the tube and a core traversed by a threaded bore at its central part, and engaged within the casing in order to effect the blocking of the plug in the tube by diametral expansion of the casing, this device permitting the limiting of possible leaks and the avoidance of the risks of fracture and of ejection of the casing of the closure plug of the tube, in the steam generator in service.

To this end, the obturating and retaining device according to the invention comprises a threaded rod capable of being screwed into the threaded hole traversing the core and solid, at one of its ends, with a blocking element, the external diameter of which is greater than the diameter of the rod, and which is intended to come into engagement in the end of the casing of the plug opposite the closure base, when the threaded rod is screwed into the bore of the core, and equipped with means cooperating with the end of the casing of the plug, in order to achieve the blocking, in rotation and/or in translation, of the obturating device.

BRIEF DESCRIPTION OF THE DRAWINGS

In order to provide a good understanding of the invention, a description will now be given, by way of example, with reference to the accompanying drawings, of a plurality of embodiments of an obturating and retaining device according to the invention.

DESCRIPTION OF PREFERRED EMBODIMENT

Figure 1:
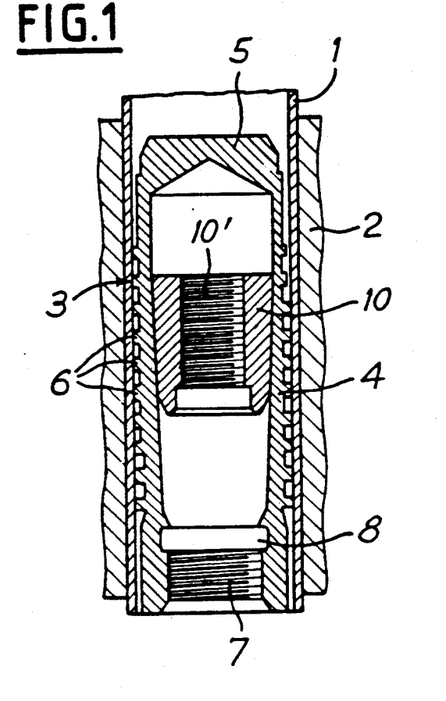
FIG. 1 is a view, in cross-section through an axial plane of symmetry, of a plug according to the prior art in positon for the sealed closure of the end of a tube of a steam generator of a pressurized-water nuclear reactor.

FIG. 1 shows the end of a tube 1 of a steam generator fixed by crimping within an opening traversing the tube plate 2 of the steam generator.

A plug 3 is fixed within the end of the tube 1 in such a manner as to ensure the sealed closure thereof.

The plug 3 comprises a tubular casing 4 closed by a base 5 at one of its ends and has on its external surface annular ribs 6 projecting radially.

The open end of the casing 4 opposite the base 5 of the plug is presennt in the form of a threaded bore 7 limited towards the interior of the plug by an annualr throat 8.

The obturating plug 3 likewise comprises an expander core 10 with an external surface of frusto-conical shape and a threaded central bore 10'.

The diameter of the threaded bore 10' of the expander core 10 is substantially less than the diameter of the threaded bore 7 of the lower end part of the plug opposite the base 5.

The internal bore of the casing 4 of the plug 3 has a maximum internal diameter in its upper part below the base 5 and a minimum diameter in its lower part. This bore has a frusto-conical shape corresponding to the frusto-conical shape of the external surface of the expander core 10 over at least a part of its length.

When the plug 3 is placed in position in the tube 1, the expander core 10 is situated in the large-diameter upper part of the bore of the casing 4.

The diametral expansion of the casing 4 within the tube 1 is obtained by traction on the expander core 10 by virtue of a threaded rod of a traction tool, engaged into the threaded bore 10' of a core 10.

The expander core 10 comes into a position in which it ensures the expansion of the casing 4 in the tube 1, in a zone of the casing comprisisng external ribs 6. The contact under high pressure of the ribs 6 and of the internal surface of the tube 1 effects the blocking and the sealing of the plug.

In order to effecxt the demounting of the plug, a thrust is exerted on the expander core 10 in order to displace it in the direction of the large-diameter upper part of the casing 4. The core 10 may come into contact with the base 5 on which it exerts a thrust ensuring an extension of the casing 4 of the plug. The thrust on the core 10 is exerted by a tool comprising a thrust rod screwed into the threaded bore 10' of the core 10 and a body fixed by screwing into the threaded bore 7 of the casing of the plug in relation to which the rod is movable. When the extension of the casing of the plug has been carried out, the latter may be extracted from the tube 1 by simple traction, by virtue of the contraction effect obtained.

Figure 2:
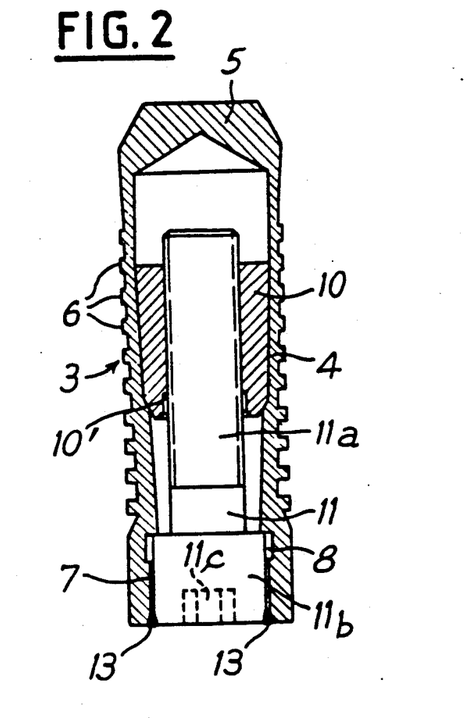
FIG. 2 is a view, in cross-section through an axial plane of symmetry, of a closure plug of a steam generator tube comprising an obturating and retaining device according to the invention and according to a first embodiment.

FIG. 2 shows a closure plug of a steam generator tube of the type represented in FIG. 1, in which an obturating and retaining device according to the invention has been placed.

Throughout the continuation of the description, the elements constituting the plug itself will be designated by the references which have already been used to designate the corresponding elements of the plug represented in FIG. 1.

The device 11 for obturating and retaining the plug 3 is constructed in the form of a screw 11, the threaded rod part 11a of which constitutes a rod which can be engaged by screwing within the threaded bore 10' of the expander core 10. The device 11 comprises a head 11b, the diameter of which is greater than the diameter of the rod 11a and less than the internal diameter of the threaded bore 7 of the casing of the plug. The head 11b comprises an opening 11c of hexagonal cross-section of the six-hollow-face type the screwing of the device 11 into the expander core 10 of the plug.

The positioning of the obturating and retaining device 11 within th ebore of the plug is effected in the case where cracks have been detected in the casing 4 of the plug. The pacing in positioning could likewise be effected a priori after the plugging of the tube has been effected.

The screwing of the device 11 into the bore of the core 10 is continued until the head 11b has entirely penetrated into the entrance part of the bore of the plug opposite its base 5. On completing the screwing, the shoulder of the device 11 separating its parts of small and of large diameter may come into abutment with the base of the throat 8.

The blocking against rotation and translation of the obturating device 11 is then effected by weld points 13 ensuring the fixing of the head 11b of the device 11 on the end part of the casing 4 of the plug.

When the steam generator is restored to service, after placing in positioning of the obturating device 11 in the plug 3, the pressurized primary water of the steam generator may still penetrate within the bore of the casing 4, the obturating device 11 not being fixed in a sealed manner on the entrance end of the plug.

However, the primary water suffers a large head loss, in traversing the narrow spaces subsisting between the head 11b and the threaded bore 7 and especially, at the location of the surfaces in contact of the threaded rod 11a and of the threaded bore 10' of the expander core 10.

The leakage of primary liquid, at the location of the plug, when the latter exhibits cracks or a fracture zone, is limited to a low value.

In the case of a fracture of the plug in its upper part, the pressure which is exerted on the base 5 of the plug diminishes very rapidly and cannot be maintained by the limited flux of primary water; this limits the risks of ejection of the upper part of the plug under the effect of the primary pressure.

This leads to the avoidance of a deterioration or a fracture of the tube by high-speed ejection of the upper part of the plug, under the effect of the primary pressure.

Moreover, the device 11 ensures the maintenance of the lower part of the plug and of the expander core 10 into which the threaded rod 11a is screwed.

In the case of a fracture of the plug below the expander core, the retention in position of the plug is ensured by means of the device 11 and of the expander core 10.

In all cases, the leakages of primary fluid towards the secondary part of the steam generator are limited.

Figure 3:
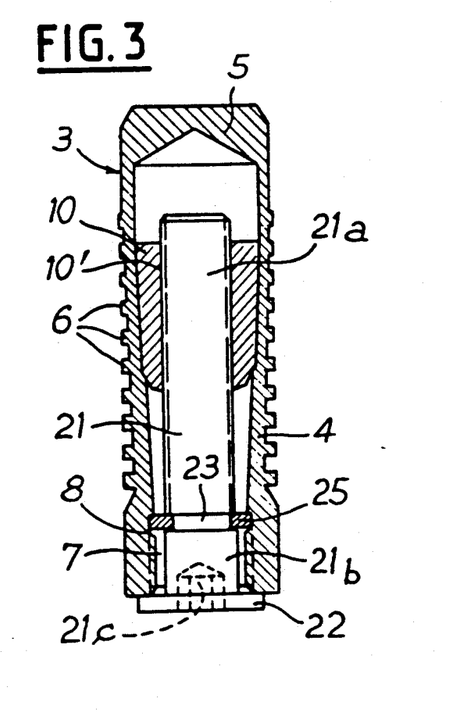
FIG. 3 is a view, in cross-section through an axial plane of symmetry, of a closure plug of a steam generator tube comprising an obturating and retaining device according to the invention and according to a second embodiment.
Figure 4:
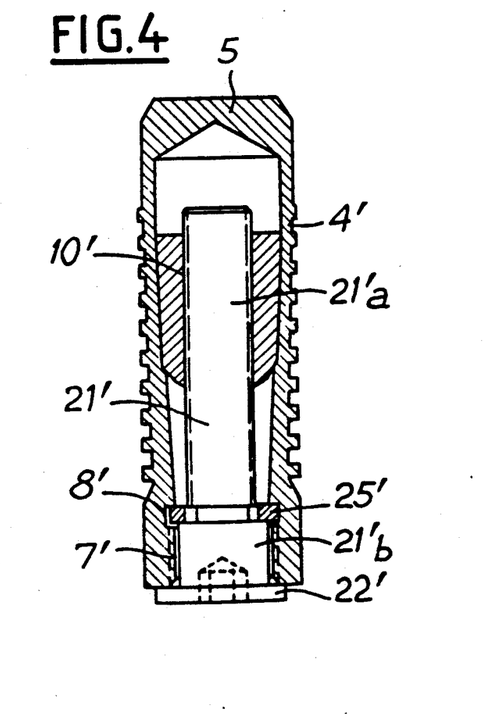
FIG. 4 represents a variant of the device according to FIG. 3.

A second embodiment of the device for obturating and retaining a closure plug of a steam generator tube has been shown in FIGS. 3 and 4.

The device 21 shown in FIG. 3 comprises a threaded rod 21a which can be engaged into the threaded bore 10' of the expander core 10 and a head 21b of enlarged diameter which comes to be received in the entrance bore 7 of the casing 4 of the plug. This part 21b comprises, at its end, a supporting collar 22. The enlarged part 21b likewise comprises a profiled opening 21c of hexagonal shape constituting a hollow prismatic surface with six faces into which it is possible to introduce a tool for screwing and unscrewing the rod 21a in the expander core.

The obturating device 21 further comprises, at the upper part of the enlarged-diameter head 21b, a toroidal throat 263, the cross-section of which is substantially semi-circular. An elastic ring 25, which may be split, is placed in the throat 23, before the introduction of the obturating device within the plug 3.

During the screwing of the obturating device 21, the elastic washer 25 is retracted in the radial directions within the throat 23 and can thus be pushed within the threaded bore 7 of the casing 4 of the plug, until the ring 25 reaches the end of the bore, at the location of the throat 8.

The elastic washer 25 comes to be received in the throat 8 by elastic radial expansion while performing the blocking of the devcice 21 by clamping. Furthermore, in the position of blocking of the obturating device 21, the collar 22 is in abutment on the end of the casing 4 of the plug 3 and thus participates in the blocking of the obturating device in the plug.

FIG. 4 shows a ariant of the obturating device represented in FIG. 3; the elements corresponding to the elements of the device represented in FIG. 3 bear the same references but with the superscript'.

In the case of the modified embodiment of FIG. 4, a toroidal elastic ring of square cross-section 25' is threaded onto the lower part of the rod 21'a in order to come into abutment on a shoulder separating the end of the rod 21'a from the large-diameter head 21'b.

During the screwing of the device 21' within the plug, elastic ring 25' retracts in order to pass within the threaded bore 7'.

When the elastic ring 25' arrives at the end of the threading, it clamps the device 21' by diametral expansion within a non-threaded, enlarged part 8' of the bore 7' delimited by a recess machined within the casing 4' of the plug.

The obturating device represented in FIGS. 3 and 4 has the same advantages as the device represented in FIG. 2, as regards the limitation of the leaks and of the pressure at the location of the base of the plug and as regards the retention of the plug.

Moreover, the obturating device according to the embodiment represented in FIGS. 3 and 4 can be demounted by simple unscrewing, the clamps 25 or 25' undergoing a diametral retraction when a sufficient unscrewing torque is exerted on the device 21 or 21'.

In both cases, a collar 22 or 22' ensures the blocking of the obturating device when the primary pressure is exerted on this device.

As in the embodiment represented in FIG. 2, the obturating device is not entirely sealed and primary water comes to fill, in service, the casing of the plug, so that the various elements constituting the obturating device and the plug are subjected to contact with a same fluid and brought to a same temperature.

Figure 5:
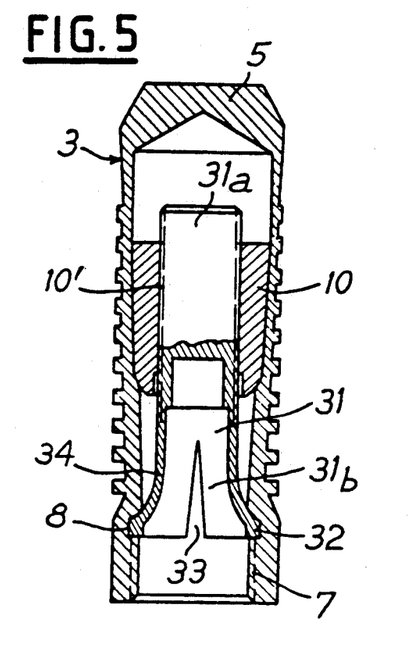
FIG. 5 is a view, in cross-section through an axial plane of symmetry, of a closure plug of a steam generator tube comprising an obturating and retaining device according to the invention and according to a third embodiment.

FIG. 5 shows a third embodiment of an obturating and retaining device according to the invention.

The various parts of the plug 3 bear the same references as in FIG. 1, 2 and 3.

The obturating device 31 comprises a threaded rod 31a and an end part 31b which is attached on the rod 31a and in its axial extension, comprising a lower part, the diameter of which is substantially greater than the diameter of the rod 31a.

The part 31b of the device is constituted by a tubular element flared at its lower end 32 and comprising a plurality of slits 33 of substantially axial direction. These slits 33 delimit elastiic plates 34 comprising a support lug at the end corresponding to the end of the part 31b of the device.

The part 31b of the device may be constituted by four or six plates, depending upon the desired flexibility.

When the screwing of the threaded rod 31a into the threaded bore 10' of the expander plug 10 is undertaken, the plates 34 flex towards the interior and permit a diametral retraction of the part 31b of the device 31 ensuring the passage of this part 31b in the threaded bore 7 of the plug.

When the end lugs of the plates 34 arrive at the location of the throat 8 by which the threaded part of the bore 7 terminates, the plates 34 can move apart from one another in order to perform the diametral expansion of the part 31b of the device. The end lugs of the plates 34 perform the blocking of the obturating device against a bordering machined in the casing 4 of the plug and delimiting the throat 8.

As previously, the obturating and retaining device represented in FIG. 5 permits the limiting of the leakage of primary fluid into the internal volume of the casing of the plug. In the case of a cracking and of a fracture of the plug above the expander core 10, the pressure diminishes very rapidly and cannot be maintained at the level of the primary pressure, in contact with the internal surface of the base 5 of the plug, on account of the limited leakage of primary fluid, especially along the threading of the rod 31a engaged into the expander plug 10.

As in the case of the embodiment represented in FIGS. 3 and 4, the obturating device represented in FIG. 5 can be demounted by unscrewing the rod 31a.

Figure 6:
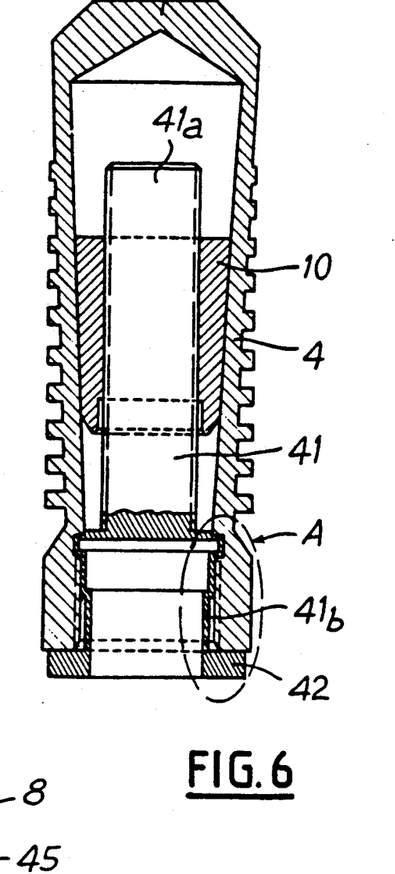
FIG. 6 is a view, in cross-section through an axial plane of symmetry, of a closure plug of a steam generator tube comprising an obturating and retaining device according to the invention and according to a fourth embodiment.
Figure 6A:
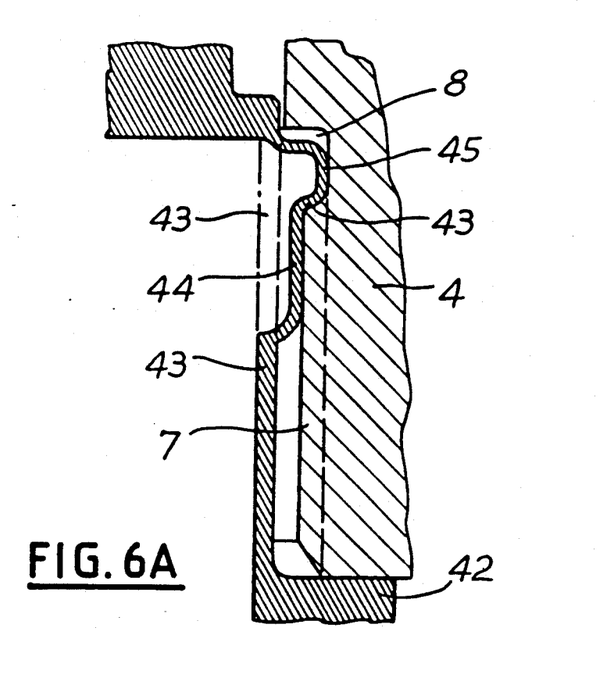
FIG. 6A ia an enlarged view of the detail A of FIG. 6.

In the case of the embodiment represented in FIGS. 6 and 6A, the obturating and retaining device 41 is constituted by a threaded rod 41a which is solid, at one of its ends, with an enlarged part 41b constituted by a deformable thin ferrule 43 which is solid, at its end opposite the threaded rod 41a, with a supporting collar 42.

FIG. 6A shows in mixed lines the original shape of the upper part of the ferrule 43 and in solid lines the shape of this part 43 after deformation in such a manner as to execute the blocking of the obturating device 41 in the plug.

The thin ferrule 43 exhibits over its entire length, in its original form, an external diameter less than the internal diameter of the threaded bore 7 of the plug.

After positioning of the obturating device by screwing the rod 41a into the threaded bore of the expander core 10, a tool is introduced within the deformable ferrule 43 in order to accomplish the deformation thereof and the diametral expansion thereof, as can be seen in FIG. 6A.

A first part 44 of the ferrule 43 undergoes a diametral expansion in such a manner as to come into contact with the internal surface of the threaded bore 7. A second part 45 of the deformable ferrule 43 undergoes an additional diametral expansion in order to come to be received in the throat 8 situated above the threaded part of the bore 7 within the casing 4 of the plug.

The final fixing of the obturating device within the plug is thus accomplished.

Figure 7:
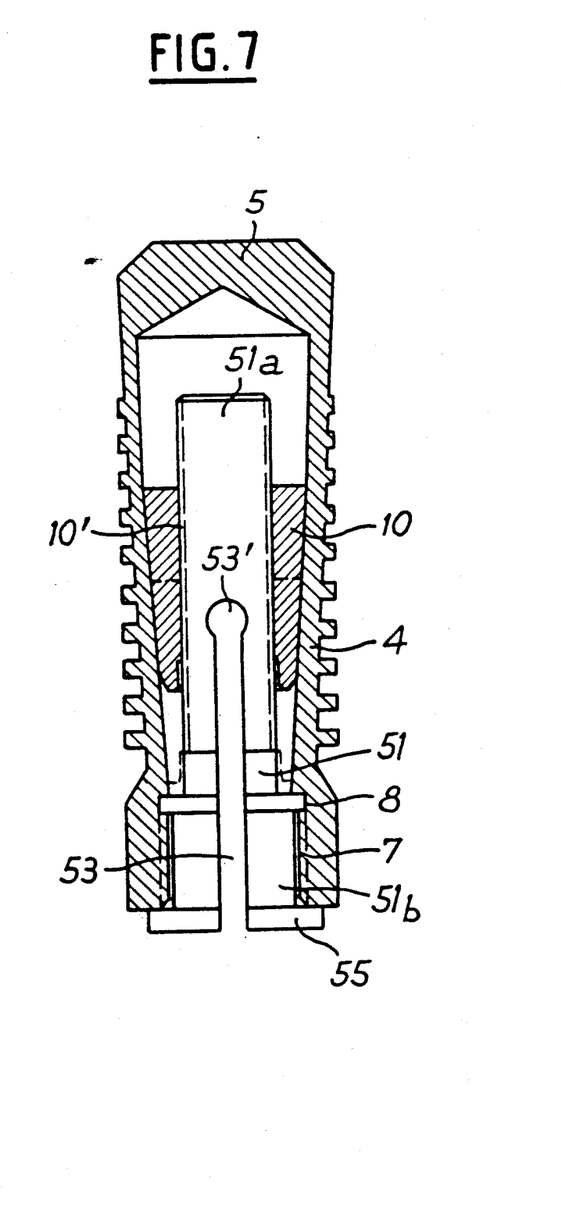
FIG. 7 is a view, in cross-section through an axial plane of symmetry, of a closure plug of a steam generator tube comprising an obturating and retaining device according to the invention and according to a fifth embodiment.
Figure 7A:
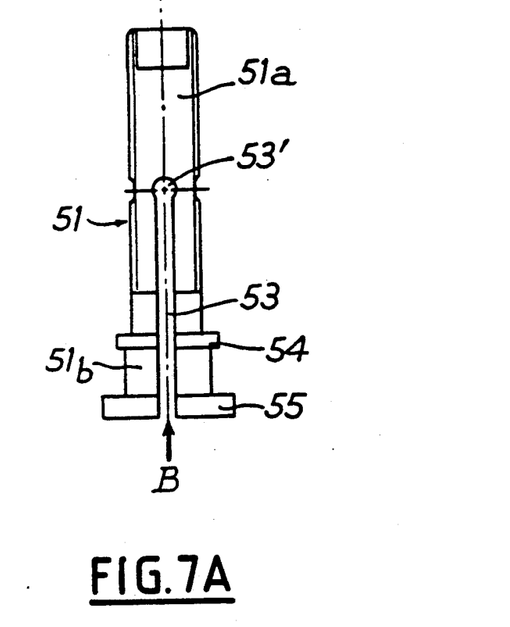
FIG. 7A is a side elevation view of the device for obturatingf and retaining the plug represented in FIG. 7.
Figure 7B:
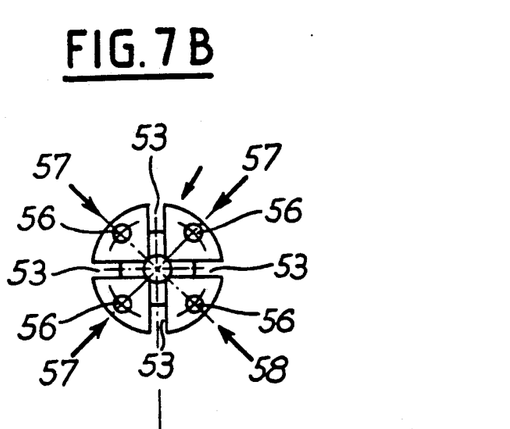
FIG. 7B is a view in the direction of arrow B of FIG. 7A.

In the embodiment represented in FIGS. 7, 7A and 7B, the obturating and retaining device 51 is constituted by a threaded rod 51a which is solid, at one of its ends, with an enlarged-diameter part 51b. The enlarged-diameter part 51b is separated from the smaller-diameter part constituting the threaded rod 51a by an annular collar 54. The enlarged part 51b likewise comprises, at its end opposite the collar 54, a second collar 55 intended to come into abutment on the end of the casing 4 of the plug in order to accomplish the blocking of the obturating device after the positioning thereof.

The device 51 comprises four slits 53 placed at 90° with respect to one another, over the entire length of the enlarged-diameter part 51b and over a part of the length of the threaded rod 51a delimiting four flexible branches. The slits 53 are terminated by passages 53' of rounded form, at the location of the threaded rod 51a.

The collar 55 is pierced by four holes 56 which are each placed at the end of a branch delimited by two slits 53.

The holes 56 permit the engagement of end fingers of a tightening tooling permitting the approach to one another, in radial directions 57, of the four branches of the device 51 which are delimited by the slits 53.

When the branches of the device 51 are placed in their close position, the collar 54 may be introduced into the threaded bore 7 of the plug, in such a manner as to permit the screwing of the rod 51a into the threaded hole 10' of the expander core 10.

The screwing of the rod 51a into the expander core 10 is continued until the time when the collar 54 arrives at the location of the throat 8 delimiting the threaded part of the bore 7. The tightening pressure of the tooling is then released, so that the branches delimited by the slits 53 are displaced towards the exterior, by elasticity. The four parts of the collar 54 come to be received within the throat 8, in order to ensure the blocking of the obturating device 51 within the casing 4 of the plug. The blocking of the obturating device 51 is completed by placing of the collar 55 in abutment on the base of the casing of the plug.

The device represented in FIGS. 7, 7A and 7B permits, just like the previously described devices, the limiting of the leakages of primary fluid in the event of cracking or of fracture of the plug and the risks of ejection, under the effect of the primary pressure, of the upper part of the plug.

The device is demountable by means of the tool for tightening the branches, which tool may be used to effect the unscrewing of the threaded rod 51a.

Figure 8:
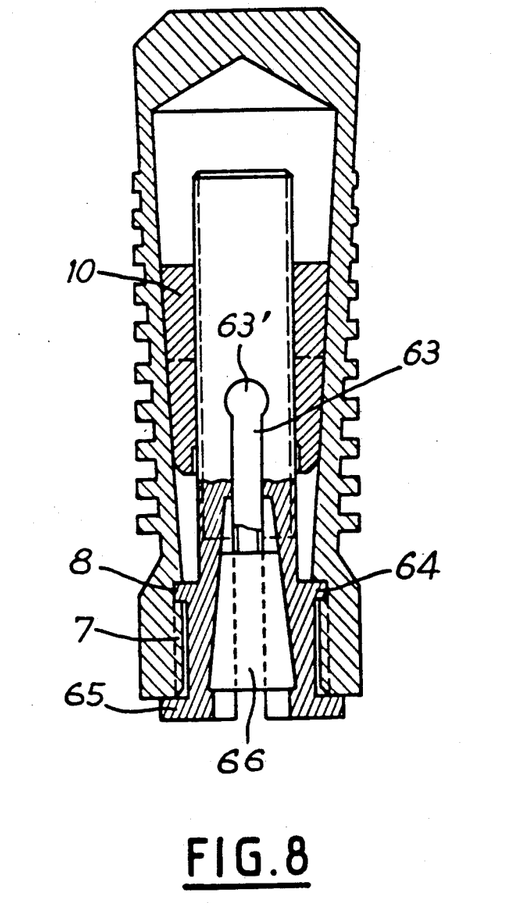
FIG. 8 is a view, in cross-section through an axial plane of symmetry, of a closure plug of a steam generator tube comprising an obturating and retaining device according to a sixth embodiment.
Figure 8A:
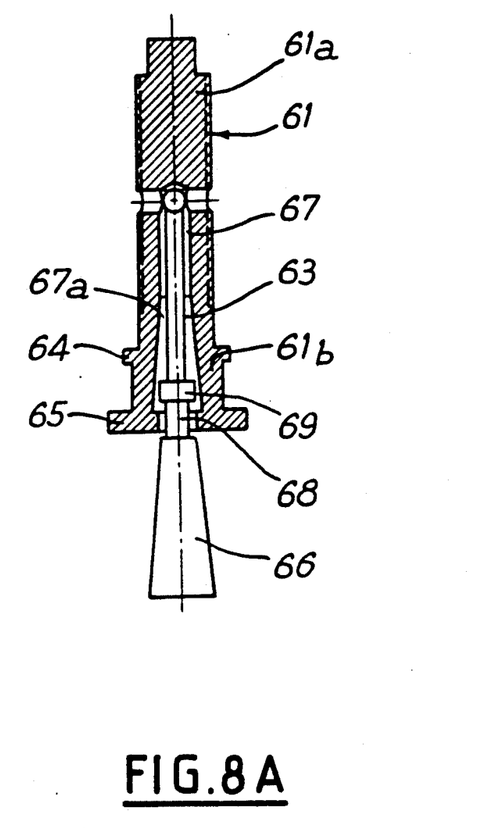
FIG. 8A is a view, in cross-seciton, of the device for obturating and retaining the plug represented in FIG. 8 before it is placed in position in the plug.

FIGS. 8 and 8A show a modified embodiment of the device which has been described with reference to FIGS. 7, 7A and 7B.

This device 61 is constituted in a general way in the same manner as the device 51 and comprises a threaded rod 61a solid with a large-diameter part 61b, which is itself delimited by two collars 64 and 65.

The device 61 comprises four slits 63 at 90° traversing the large-diameter part 61b over its entire length in the axial direction and a part of the threaded rod 61a. The slits 63 delimit four branches having a certain flexibility, which branches may be separated from one another by using a spacing device constituted by a frusto-conical element 66 which is introduced into a central bore 67 of the element 61 into which each one of the slits 63 opens. The bore 67 comprises a frusto-conical part 67a, the shape of which corresponds to the external surface of the frusto-conical element 66. The frusto-conical element 66 comprises a catch rod 68 terminated by an enlarged portion 69, the diameter of which is greater than the diameter of the opening 67 when the branches of the device 61 are in their normal position in which they do not experience any separating force. In this manner, the frusto-conical element 66 remains fixed to the body of the obturating device 61.

When the branches of the device 61 are not pushed back towards the exterior by the device 66, the device 61 may be introduced within the plug, the external diameter of the collar 64 being less than the internal diameter of the threaded bore 7 of the plug. The screwing of the threaded rod 61a into the expander core 10 is undertaken until the time when the collar 64 comes opposite the throat 8 delimiting the threaded bore 7. The collar 65 is then in contact with the end of the plug. The blocking of the obturating device in the plug is then undertaken by exerting an axial thrust on the frusto-conical element 66, which comes to be received within the frusto-conical part 67a of the bore 67. In this position, as represented in FIG. 8, the branches of the device 61 are spaced apart, so that the collar 64 comes to be received in the throat 8 and blocks the obturating device.

The positioning of the obturating device is irreversible, since it is no longer possible to retighten the branches of the device in order to extract the collar 64 from the throat 8.

Figure 9:
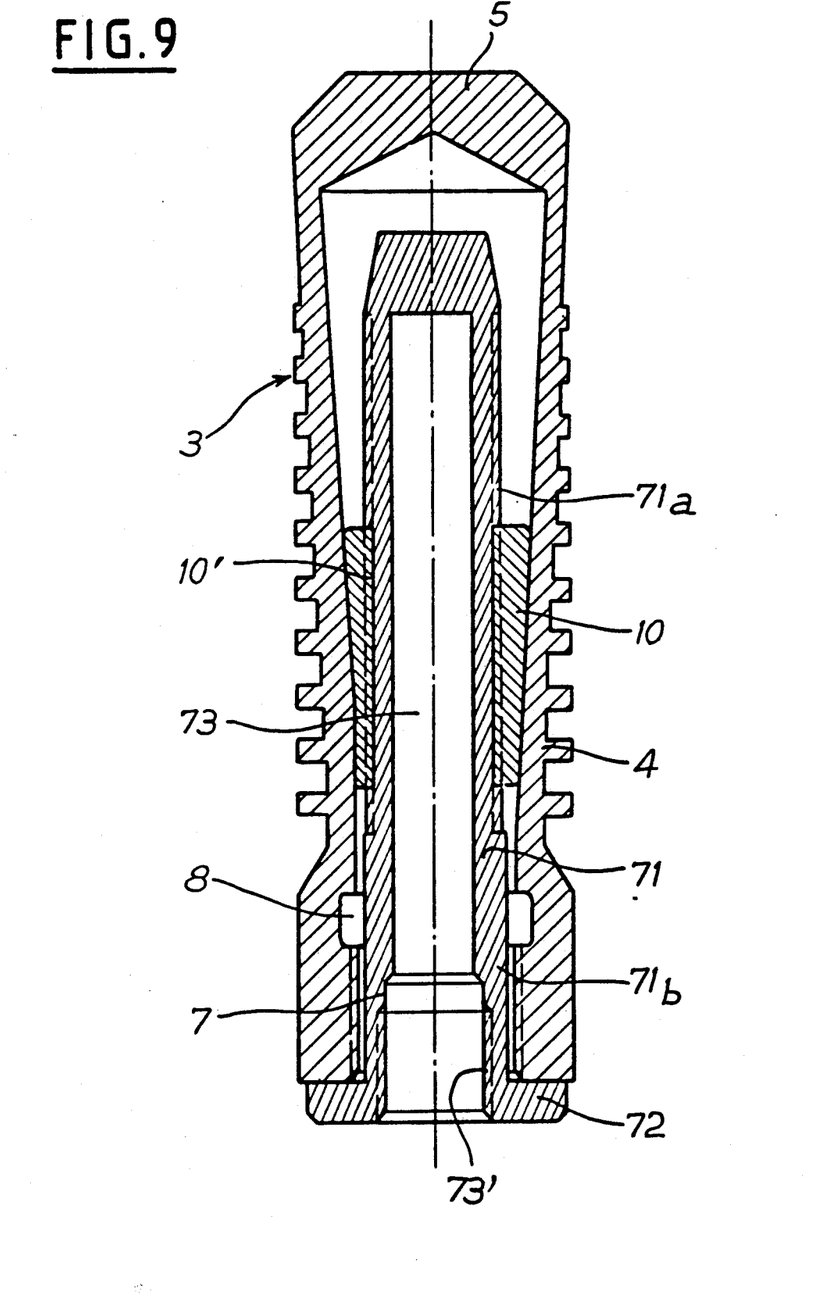
FIG. 9 is a view, in cross-section through an axial plane of symmetry, of a closure plug of a steam generator tube comprising an obturating and retaining device according to the invention and according to a seventh embodiment.

FIG. 9 shows a plug into which there is introduced an obturating and retaining device 71 constituted by a threaded rod 71a solid, at one of its ends, with a head 71b terminated by a collar 72 intended to come into abutment on the end of the casing 4 of the plug.

The device 71 comprises a blind central bore 73 closed within the threaded rod 71a and opening by the head part 71b of the device at the location of the collar 72.

The threading of the rod 71a has a pitch less than the pitch of the threaded bore 10' of the expander core 10.

The central bore 73 of the obturator 71 terminates in a threaded part 73', the diameter of which is greater than the diameter of the regular part of the bore 73.

The threaded bore 73' permits the fixing, within the bore 73, of a device for extending the rod 71a of the obturator which may be constituted by a jack, the body of which may be screwed into the threaded bore 73' and the rod of which comes into thrust contact with the base of the bore 73, in order to effect the extension of the threaded rod 71a.

The supply pressure of the jack is such that the force exerted on the threaded rod 71a involves an extension of this screw harmonizing completely the screw pitches of the threaded rod 71a and of the threaded bore 10' of the expander core 10.

The threaded rod 71a extended by the jack may be screwed into the threaded bore of the expander core 10.

At the end of the screwing operation, the pressure of the jack is released and the threads of the threaded rod 71a and of the threaded bore of the expander core 10 come to block against one another, on account of the diminution of the screw pitch of the threaded rod 71a, under the effect of the elastic restoring forces in the metal of this threaded rod.

This leads to a clamping of the threaded rod at the location of the expander core 10 and a retraction of the part of the obturator situated between the core and the collar 72, which comes to be applied under pressure against the end of the plug.

In this way, blocking of the obturator 71 within the plug 3 is achieved in a positive manner.

As in the case of the previously described embodiments, the obturator 71 does not ensure a sealed closure of the interior volume of the casing 4 of the plug which is capable of being filled with primary fluid both in its part situated above the expander core 10 and below the base 5 and in its part situated below the expander core 10.

In the event of cracking or of fracture of the plug, the leaks of primary fluid at the location of the obturator are greatly limited, by head loss effect, in particular along the threads of the threaded rod and of the bore of the expander core; this permits the avoidance of risk of sudden ejection of the upper part of the casing of the plug and limits the introduction of primary fluid into the secondary part of the steam generator.

Figure 10:
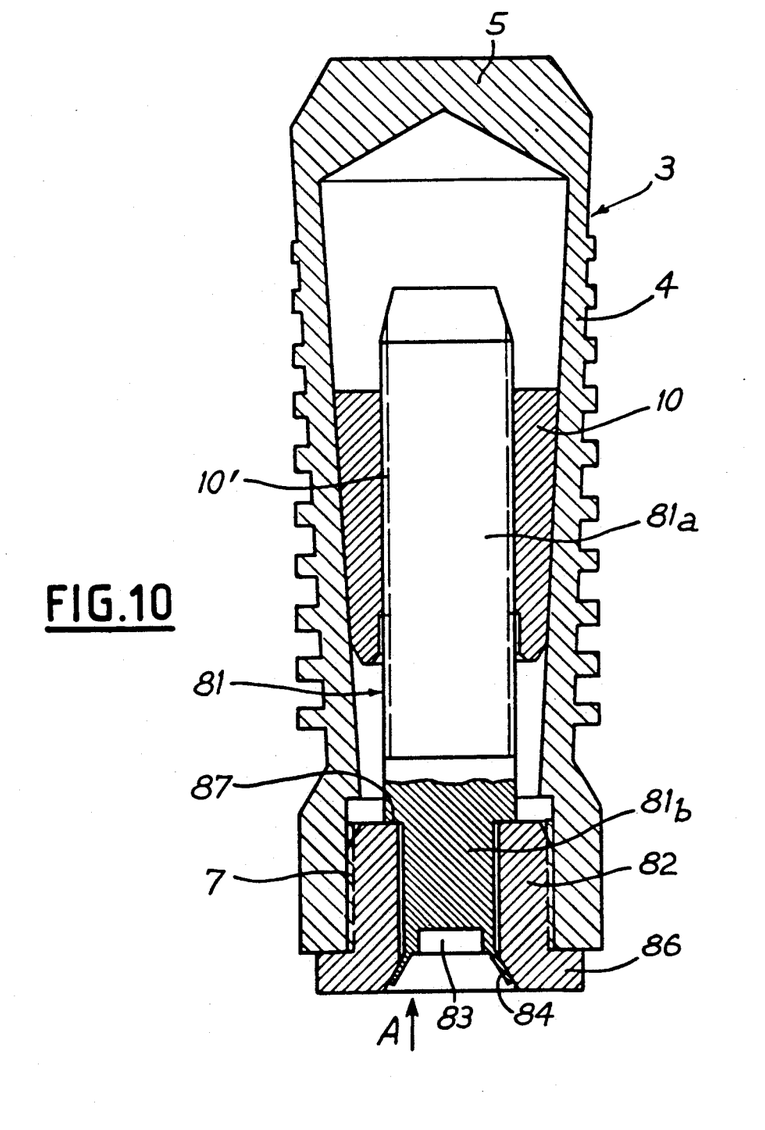
FIG. 10 is a view, in cross-section through an axial plane of symmetry, of a closure plug of a steam generator tube comprising an obturating and retaining device according to the invention and according to an eight embodiment.
Figure 10A:
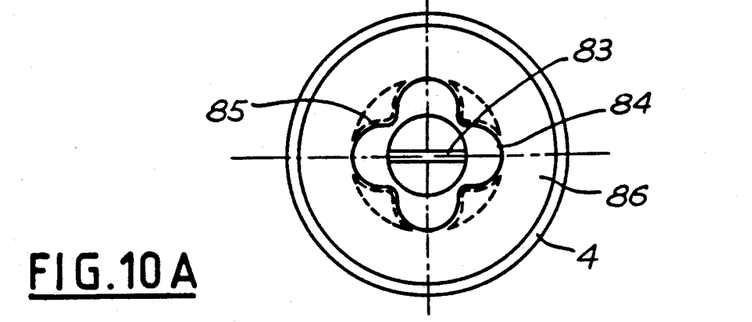
FIG. 10A is a bottom view in the direction of arrow A of FIG. 10.

FIGS. 10 and 10A show a plug 3 comprising a tubular casing 4 and an expander core 10, into which there is introduced an obturating and retaining device 81 constituted by a threaded rod 81a engaged into the threaded bore 10' of the expander core 10 and an annular nut 82 engaged into the threaded bore of the casing 4 constituting the inlet opening of the plug opposite the base 5.

The threaded rod 81a comprises an end 81b, the diameter of which is less than the internal diameter of the nut 82; when the obturating device 81 is placed in position in the plug and fixed by means of the nut 82 in the manner which will be described hereinbelow, the end 81b of the threaded rod comes to be received within the bore of the nut 82.

The nut 82 is threaded on its external surface, while its central bore is smooth.

The threading of the nut 82 which corresponds to the threading of the opening 7 has a screw pitch different from that of the threaded rod 81a which corresponds to the threading of the bore 10' of the expander core.

The end 81b of the threaded rod 81a comprises, on its lower face, a screwdriver slot 83 and an extension 84 constituted by a deformable thin ferrule placed in a coaxial manner in relation to the threaded rod 81a at the periphery of the lower face of the end part 81b.

The nut 82 comprises a supporting collar 86 at one of the ends of its threaded part.

The internal bore of the nut 82 comprises, within the collar 86, four internal recesses 85 projecting radially towards the exterior.

The end part 81b of the rod 81a of reduced diameter is delimited by a shoulder 87 on which the nut 82 is in abutment when the obturating device is fixed in position in the plug 3.

The positioning and fixing of the obturating device 81 in the plug are effected in the manner which will be described hereinbelow.

The threaded rod 81a is screwed into the threaded bore 10' of the expander core 10, using a screwdriver, the blade of which is introduced into the slit 83.

The nut 82 is then screwed into the threaded bore 7 until the collar 86 comes into abutment on the end of the casing 4 of the plug. The position of the threaded rod 81a may be regulated in such a manner as to eliminate the clearance between the shoulder 87 and the nut 82 by unscrewing the threaded rod.

The threaded rod 81a and the nut 82 cannot be unscrewed simultaneously, the screw pitches of their threadings being different.

After screwing the rod and the nut, the blocking in rotation of these two parts is undertaken by crimping, by deforming the ferrule 84, within the internal recesses 85.

In the event of cracking of the casing of the plug, the obturating and retaining device 81 operates in the same manner as the previously described devices.

In all cases, the described devices according to the invention permit either the limiting of the consequences of a cracking or of a fracture of the casing of a plug, or alternatively the increasing of the security of these plugs in operation, if the obturator is placed in position immediately after the setting of the plug, without awaiting the appearance of cracks in its casing.

Should the casing of the plug break below the core, the threaded rod ensures that the core and upper part of the casing are retained.

However, in this case, the vibrations generated by the circulation of the primary water coming into contact with the plug can give rise to risks that the core and the threaded rod will separate by unscrewing, with the result that the retention device no longer performs its function.

FIGS. 11, 11A, 12, 13 and 13A show the different embodiments of a shut-off and retention device according to the invention, comprising complementary means making it possible to limit or prevent risks of unscrewing of the core engaged forcibly inside the casing of the plug and consequently to improve the retention of the plug casing, should this casing break in its lower part.

In the case of such improved embodiments, the threaded rod has at least one transverse orifice which is perpendicular relative to its axis and opens out on either side of the rod, and in which is engaged a braking piece intended to come into contact by means of end parts with the flights of the internally threaded hole of the core when the threaded rod is being screwed into the core.

Figure 11:
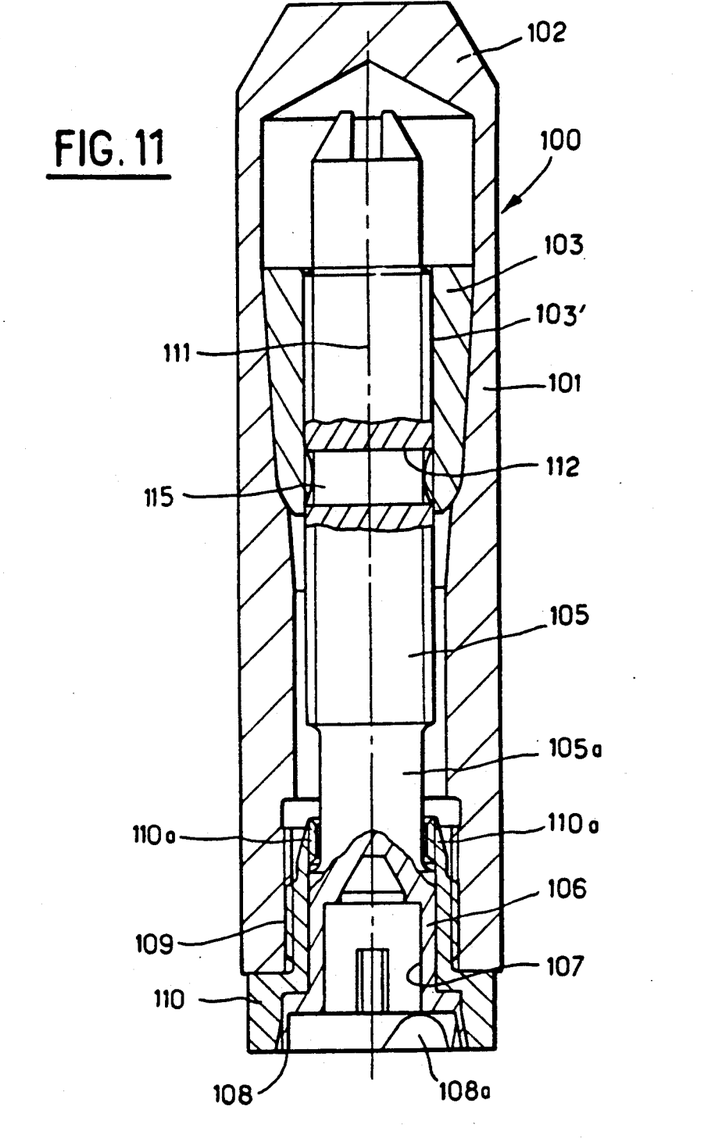
FIG. 11 is an elevation view, partially in section in an axial plane of symmetry, of a generatortube closing plug having a shut-off and retention device as shown in FIGS 10 and 10A and improved according to a first embodiment, the expander core of the plug being in a first tightening position.
Figure 13:
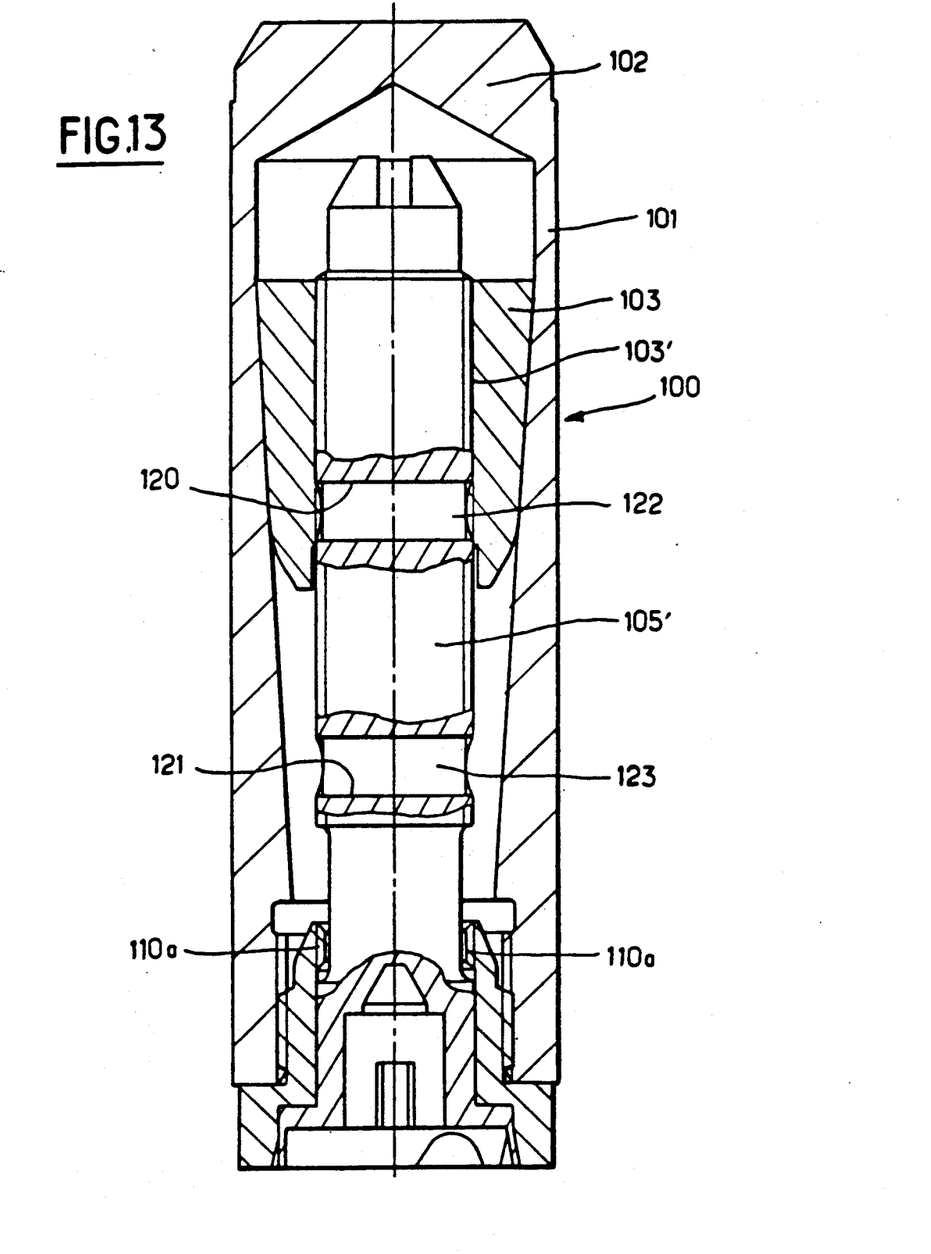
FIG. 13 is a partially sectional elevation view of a closing plug of a steam-generator tube, possessing a shut-off and retention device as shown in FIGS. 10 and 10A and improved according to a second embodiment, the expander core of the plug being in a first tightening position.

In general terms, the closing plugs illustrated in FIGS. 11 and 13 have a structure similar to the structure of the closing plug shown in FIGS. 10 and 10A.

The plug, designated as as whole by the reference 100, comprises a tubular casing 101 closed at one of its ends by means of a bottom 102 and having an inner bore of frusto-conical or frustoconically cylindrical form, in which is engaged an expander core 103, the frusto-conical form of which corresponds to that of the bore of the casing 101 of the plug.

The outer surface of the casing 101 may have radially projecting splines improving the fastening of the plug inside the tube during its diametrical expansion.

Before the plug is installed in a steam-generator tube to be closed, the expander core 103 is arranged in the upper part of the bore of the casing 101 which is the large diameter part of the bore. In this position, the expander core 103 does not exert any force on the walls of the casing 101. The expansion of the casing of the plug within the tube is obtained by exerting a downward pull on the expander core 103.

FIG. 11 shows a first tightening position of the plug, in which the expander core is in a first, intermediate position between its high position and its low position.

Figure 11A:
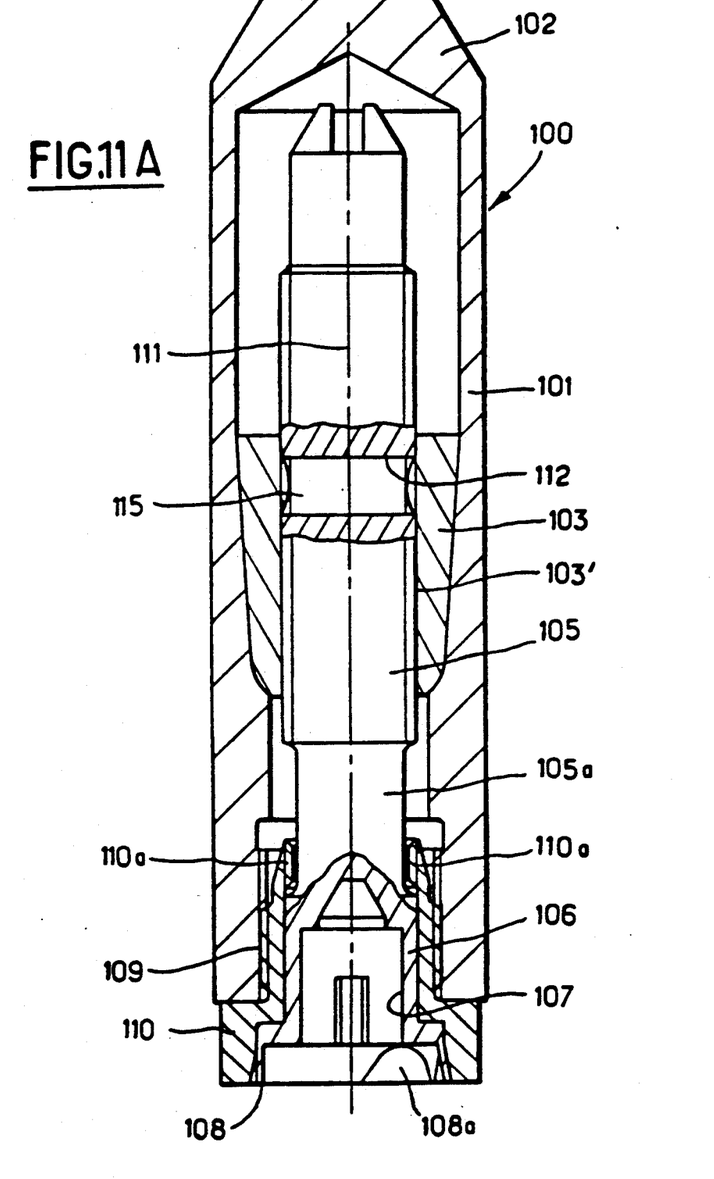
FIG. 11A is a view similar to that of FIG. 1, showing the plug with its expander core in its low position of maximum tightening.

FIG. 11A shows the plug with the expander core 103 in its low position corresponding to the maximum tightening of a plug having an increased amount of movement of the expander core 103.

The shut-off device according to the invention, which has a structure generally similar to that shown in FIGS. 10 and 10A, comprises a threaded rod 105 engaged in the internally threaded bore 103' of the expander core 103, in its operating position in which this rod ensures the retention of the expander core 103. The threaded rod 105 has a smooth end 105a extended downwards by a diametrically widened part 106, within which is machined an axially directed bore 107 having a profile and cross-section allowing the engagement of a tool of suitable form into this bore forming the lower part of the threaded rod 105, in order to effect the screwing of the rod 105 inside the internally threaded bore 103' of the expander core 103 in the tightening position inside the casing 101 of the plug.

The part 106 forming the lower end of the rod 105 is integral with a thin deformable collar 108 of which the axis coincides with the axis of the threaded rod 105.

The open lower part of the casing of the plug has an internally threaded bore 109, into which is screwed a piece 110 in the form of a tubular hollow screw or of a nut having an external thread corresponding in terms of its pitch and size to the internally threaded part 109 of the bore of the casing 101 of the plug.

The piece 110 fastened by screwing inside the casing 101 of the plug 100 forms the lower part of this casing, into which engages the blocking element of the rod 105, consisting of the deformable collar 108.

The inner bore of the piece 110 has a diametrically widened part, into which the collar 108 engages. This bore has steps projecting radially outwards, into which parts 108a of the deformable collar 108 engage by pushing, to ensure that the rod 105 engaged by screwing in the bore 103' of the expander core 103 is blocked against rotation.

The piece 110 also comprises an internal thread 110a in its upper end part. The only purpose of this internal thread 110a is to mount the piece 110 on the rod 105. The pitch and size of this internal thread therefore correspond to the threads of the rod 105.

The internally threaded bore 103' of the expander core 103 and the internally threaded bore 109 of the casing 101 of the plug have different screw pitches, and therefore, after the rod 105 has been blocked against rotation relative to the piece 110, the assembly consisting of the rod 105 and of the piece 110 can no longer be separated from the expander core 103 by unscrewing.

However, should the casing 101 break below the expander core 103, the expander core inserted forcibly into the bore of the casing 101 is liable to separate from the rod 105 unscrewing.

Figure 12:
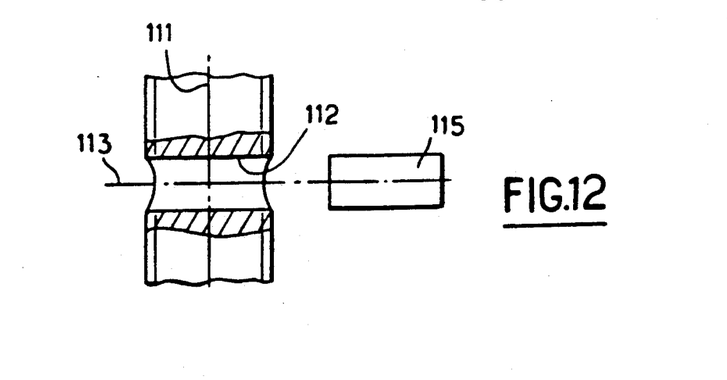
FIG. 12 is a partially sectional elevation view showing a braking piece of the shut-off device in a position allowing it to be inserted into the orifice of the threaded rod.

According to the present improvement, as can be seen in FIGS. 11 and 12, the rod 105 is pierced by a transverse orifice 112 perpendicular to its axis 111 and opening out on either side of the lateral surface of the rod 105 in its threaded part.

Preferably, the orifice 112 is of circular cross-section and has an axis 113 directed according to a diameter of the cross-section of the rod 105.

As can be seen in FIG. 12, before the threaded rod 105 is screwed into the internally threaded bore 103' of the core 103, a braking piece 115 of cylindrical form, the diameter of which is equal, apart from the assembly play, to the inside diameter of the orifice 112, is engaged and introduced into the orifice 112.

The braking piece or insert 115 is shorter than the maximum outside diameter of the threaded part of the rod 105 and very slightly larger than the diameter of this rod at the thread bottom.

When the braking piece 115 is introduced in a centered position in the orifice 112, only its end part projects very slightly, over a small arc length of its cross-section, in relation to the edge of the orifice 112, in the part of the latter opening onto the threaded lateral surface of the rod 105.

When the rod 105 of the shut-off and retention device according to the invention, equipped with the braking piece 115 introduced into a transverse orifice 112, is screwed inside the bore 103' of a core 103 placed in a tightening position, as shown in FIG. 11 or in FIG. 11A, the end parts of the braking piece 115 come into contact with the first flight of the internally threaded bore 103' located at the lower end of this internal threaded bore 103'.

The braking piece 115 is produced from a material of which the hardness is far less than the hardness of the material from which the expander core 103 is made. The expander core 103 may consist of a high-strength nickel alloy and the braking piece 115 of a low-alloy and low-hardness nickel-based material.

At the moment when the braking piece comes into contact with the first flight of the internally threaded bore 103', the tightening torque increases very substantially and remains high during the first revolution executed by the threaded rod 105, after the braking piece 115 has come into contact with the first flight of the internally threaded bore 103'.

In fact, during this first revolution, the first flight of the internally threaded bore must penetrate into the metal of the projecting parts of the braking piece 115, in order to make indentations ensuring the passage of the flights.

The tightening torque subsequently decreases substantially at the end of the first revolution and then progressively during the succeeding revolutions of the threaded rod 105.

Where a braking piece used on a device for the shut-off and retention of a closing plug of a steam-generator tube is a braking piece made from a low-hardness nickel alloy, progressive decrease of the tightening occurs over ten revolutions of the threaded rod 105, this torque remaining substantially higher than the tightening torque of the rod without a braking piece after ten revolutions.

As can be seen in FIGS. 11 and 11A, at the end of screwing of the rod 105, with the widened part 106 of the rod abutting the piece 110 and the collar 108 in the blocking position inside the bore of the piece 110, the braking piece 115 is liable to be at a level variable according to the height of the internally threaded hole 103' of the expander core 103, depending on the tightening position of the core.

In FIG. 11, the braking piece 115 is in contact with the first flight or with one of the first flights of the internally threaded bore 103', while in FIG. 11A the braking piece 115 is in contact with a flight of the internally threaded bore 103' located at a relatively great distance from teh first engagement flight of the internally threaded bore.

The position of the braking piece 115 in the threaded part of the screw 105 is selected in such a way that, at the moment when the threaded rod is in its final position, the braking piece 115 has executed a number of revolutions of between one and ten within the internally threaded bore 103'. Thus, the tightening torque of the rod 105 and therefore the releasing torque of the expander core in relation to this rod remain substantially higher than the tightening or releasing torque of the threaded rod when it has no braking piece.

The position of the braking piece 115 makes it possible, in all cases, to ensure that the braking piece is put into engagement with at least one of the flights of the internally threaded bore of the expander core 103.

Should the casing of the plug break below the expander core during the operation of the steam generator, the substantially increased releasing torque of the expander core makes it possible to limit the risks for the expander core and for the upper part of the plug casing to separate from the threaded rod 105 by unscrewing.

Figure 13A:
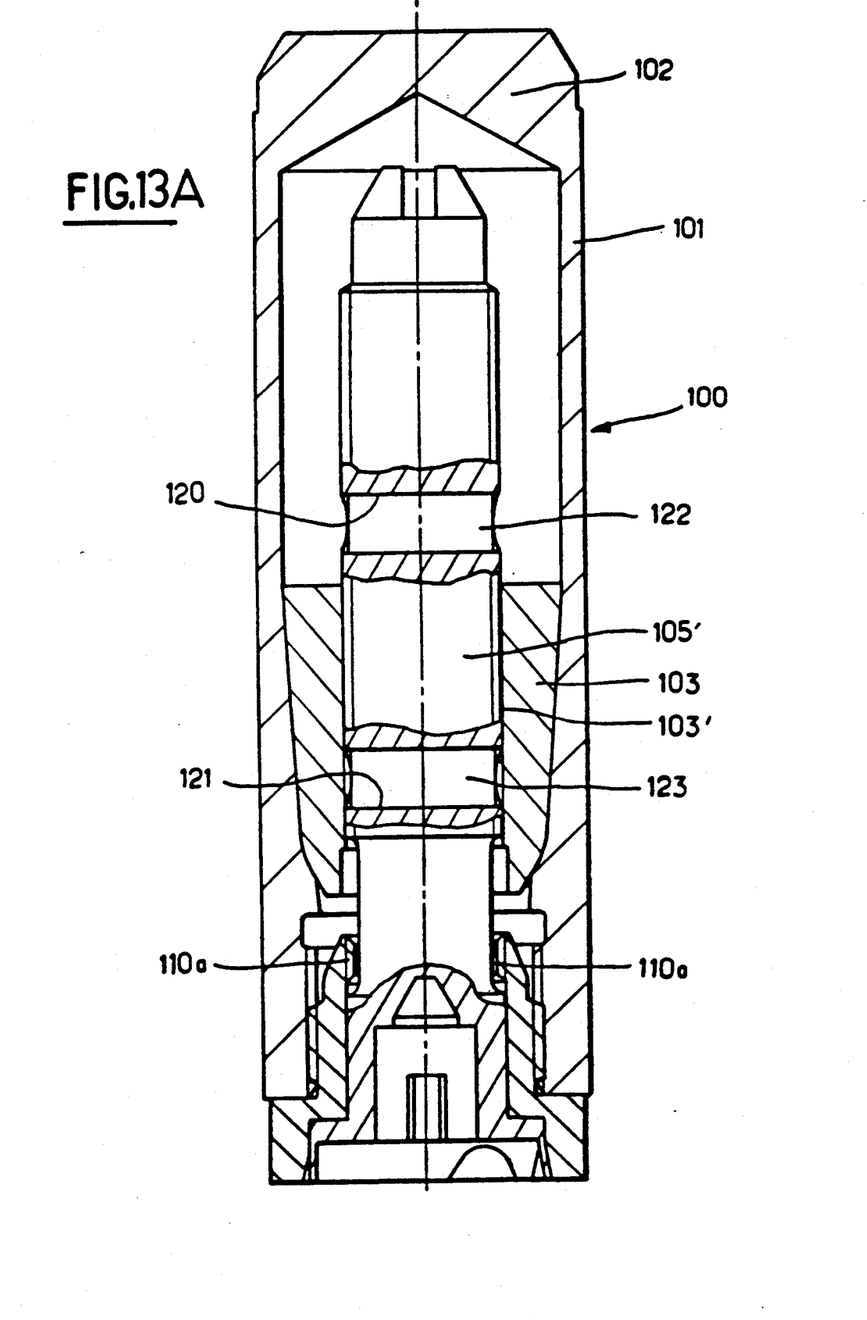
FIG. 13A is a view similar to that of FIG. 13, showing the plug with its expander core in a second position corresponding to its low position of maximum tightenting.

FIGS. 13 and 13A illustrate an alternative embodiment of the improved shut-off device according to the invention.

The corresponding elements in FIGS. 11 and 11A on the one hand and FIGS. 13 and 13A on the other hand bear the same references.

The shut-off and retention device illustrated in FIGS. 13 and 13A is virtually identical to the device shown in FIGS. 11 and 11A and comprises a threaded rod 105' integral, at one of its ends, with a widened part allowing it to be fastened relative to the casing of the plug.

To increase the safety of the device in terms of the retention of the plug casing, the rod 105' has two transverse orifices 120 and 121 passing through the threaded part of the rod 105' in two axially spaced zones respectively located in the vicinity of the center of the threaded part and in the vicinity of the lower end of this threaded part of the rod 105'.

Before the screwing of the rod 105', a braking piece 122 is introduced into the orifice 120 and a second braking piece 123 is introduced into the second orifice 121.

As described above in relation to the piece 115, the pieces 122 and 123 are produced in cylindrical form from a material of which the hardness is less than that of the material of the expander core 103. The braking pieces 122 and 123 are of such a length that their lateral end part projects slightly relative to the edge of the open ends of the orifices 120 and 121.

As can be seen in FIG. 13, the upper braking piece 122 arranged in the orifice 120 of the threaded rod is in contact with one of the first flights of the internally threaded bore 103', when the threaded rod 105' is in its final position. The braking piece 123 remains in a zone of the rod 105' not coming in contact with the internally threaded bore of the core 103.

Should the casing 101 of the plug break below the core 103, the releasing torque of this core 103 is high, insofar as the braking piece 122 is in contact with one of the first flights of the bore 103'.

Referring to FIG. 13A, it will be seen that, when the retaining rod 105' is in the final position, the upper braking piece 122 is in a zone located above the core 103 and the lower braking piece 123 is in engagement with the flights of the internally threaded bore 103' in the initial part of this bore.

Should the casing of the plug break below the expander core 103, the releasing torque of this core is high, inasmuch as the braking piece 123 has come in contact only with the first flights of the internally threaded bore 103'.

During the screwing of the rod 105', the tightening torque is relatively high, to allow the braking piece 122 to pass into the internally threaded bore 103' of the expander core 103.

To reduce this tightening torque up to the moment when the piece 123 comes in contact with the flights of the bore 103', there is an upper braking piece 122 slightly shorter than the braking piece 123.

In all cases, the complementary means shown in FIGS. 11, 11A, 12, 13 and 13A make it possible to ensure that the retention device of the plug is of greater efficiency, should the casing of the latter break below the expander core.

The positioning of the obturator may be undertaken rapidly and in a manner which is readily automatable, in the case of all the above-described embodiments.

It is possible to block the obturator against rotation and/or translation within the casing of the plug by a means different from those which have been described. Among these means, use will preferably be made either of an obturator in the form of a screw slotted according to four sectors, as described with reference to FIGS. 7, 7A and 7B as well as 8 and 8A, or an obturator comprising a fixing and blocking nut, as described with reference to FIGS. 10 and 10A. However, the other embodiments described and represented may likewise be used in an advantageous manner according to the conditions of utilization of the obturator.

The obturator may have a shape which is fairly substantially different from the shape of a solid or hollow screw described hereinabove.

In the case where complementary means are used for braking the threaded rod, the orifice passing through the rod may be arranged in a transverse direction not corresponding to a diameter of the rod, and this orifice can have a cross-section of any form.

The braking piece introduced into the orifice may also have any form, depending on the form of the cross-section of the orifice, and can be produced from any material, depending on the type of material forming the expander core.

It is possible to arrange over the length of the rod any number of braking pieces located in transverse orifices distributed over the length of the rod in a way determined by the possible positions of the expander core after the tightening of the plug.

It is likewise clear that the complementary braking means can be used on a shut-off and retention device of a form different from that described, particularly on a shut-off device according to any one of the embodiments described.

Finally, the obturating and retaining device according to the invention may be used not only in the case of the closure plugs of the steam generator tubes of pressurized-water nuclear reactors, but also in the case of the closure plugs of any steam generator tube, the heat-conducting fluid of which is at a high pressure.

We claim:

1. Device for obturating and retaining a sealed closure plug (3) of a steam generator tube (1) comprising a tubular casing (4) closed at one end of said casing by a sealed base (5) engaged into said one end of said tube (1) in such a manner that said base (5) is disposed within said tube (1) and a core (10) traversed by a threaded bore (10') at a central part of said core, and engaged within said casing (4) in order to effect blocking of said plug (3) in said tube (1) by diametral expansion of said casing (4), said device further comprising a threaded rod (11a; . . .) adapted to be screwed into said threaded bore (10') and solid, at one end of said threaded rod with a blocking element (11b; . . .) having an external diameter greater than a diameter of said threaded rod and being adapted to come into engagement in an end of said casing (4) opposite said one end when said threaded rod is screwed into said core (10), and comprising means cooperating with the end of said casing to block said obturating device against rotation and/or translation.

2. Obturating device according to claim 1, constituted in the form of a screw having a screw head (11b) which constitutes a blocking element adapted to come into engagement in a bore (7) of said casing (4) of said plug, blocking against rotation and translation of said obturating device being effected by junction weld points (13) between said screw head (11b) and said casing (4) at the location of said bore (7).

3. Obturating device according to claim 1, wherein said blocking element (21b) comprises an annular throat (23) in its part of junction with said rod (21a), a supporting collar (22) at its end opposite the threaded rod (21a) and an elastic ring (25) engaged in said throat (23) and adapted to retract by elasticity in radial directions for introduction of said ring into a bore (7) of said casing (4) located at an end of said plug opposite said base (5), during screwing of said threaded rod (21a) into said bore (10') of said core (10) and its diametral expansion in a diametrally enlarged part (8) of said bore (7).

4. Obturating device according to claim 1, wherein said blocking element (21'b) is separated from said threaded rod (21'a) by a shoulder on which there is placed in abutment an elastic ring (25') which is adapted to be retracted in radial directions in order to permit introduction of said blocking element (21'b) into a bore (7') opening at an end of said casing (4') opposite its base (5'), during screwing of said threaded rod (21'a) into said threaded bore (10') of said core (10), said elastic ring (25') being received, on completing screwing of said rod (21'a), in a diametrally enlarged part (8') of said bore (7') of said casing (4').

5. Obturating device according to claim 4, wherein the ring (25') has the shape of a torus of square cross-section.

6. Obturating device according to claim 1, wherein the blocking element (31b) is constituted by a tubular element comprising axial slits (33) delimiting radially deformable elastic plates (34) comprising ends opposite said threaded rod (31a) which are constituted by abutment lugs projecting radially towards the exterior, said elastic plates (34) being clamped in such a manner as to bring them close to one another during screwing of said rod (31a) into said core (10) and released on completing screwing, whereby end lugs of said elastic plates (34) come into a position of blocking of said obturating device, in a throat (8) in an internal bore of said casing (4).

7. Obturating device according to claim 1, wherein said blocking element (41b) is a deformable thin ferrule having an external diameter smaller than the diameter of said internal bore (7) of said casing (4) at an end of said bore opposite said base (5), blocking of said obturating device (41) against translation occurring by diametral expansion towards the exterior of said deformable ferrule (43), within a throat (8) constituting an enlarged part of said bore (7), within said casing (4).

8. Obturating device according to claim 1, in the shape of a screw (51), a head (51b) of said screw and a part of said threaded rod (51a) being traversed by axial slits (53) delimiting four branches deformable elastically in radial directions, and entirely separated, over an entire length of said head (51b) and over a part of a length of said threaded rod (51a), as well as a collar (54) projecting radially in a junction zone between said threaded rod (51a) and said head (51b) and means (56) for gripping said deformable branches of said screw, in order to effect radial retraction of said head (51b) during screwing of said threaded rod (51a) into said core (10), release of said elastic branches of said screw after screwing into said core (10) enabling blocking of said screw by introduction of said collar (54) into a throat (8) within said bore of said casing (4).

9. Obturating device according to claim 1, in the shape of a screw (61), a head (61b) of said screw and a part of said threaded rod (61a) being traversed by axial slits (63) delimiting four branches deformable elastically in radial directions, and entirely separated, over an entire length of said head (61b) and over a part of a length of said threaded rod (61a), as well as a collar (64) projecting radially in a junction zone between said threaded rod (61a) and said head (61b) and spacing means (66) introduced axially into a bore (67) at a central part of said screw (61), between said elastic branches of said screw, said collar (64) having an external diameter less than an internal diameter of said bore (7) of said casing (4) in its part opposite said base (5) in order to permit screwing of said threaded rod (61a) into said screw (10), blocking of said screw (61) constituting said obturating device being effected by introduction of said device (66) for spacing said elastic branches in such a manner as to introduce said collar (64) into an enlarged-diameter throat (8) machined within said bore of said casing (4).

10. Obturating device according to claim 9, wherein said central bore (67) of said screw (61) comprises a frusto-conical part (67a), and wherein said spacing device (66) has an external surface of frusto-conical shape corresponding to the shape of said frusto-conical part (67a) of said bore of said screw (61), spacing of said branches of said screw (61) being obtained by axial thrust on said spacing device (66).

11. Obturating device according to claim 1, wherein said threaded rod (71a) and said blocking element (71b) comprise an axial blind bore (73) traversing said blocking element (71b) over its entire axial length, a base of said blind bore (73) being located adjacent an end of said threaded rod (71a) opposite said blocking element (71b), wherein the screw pitch of the threaded rod (71a) is smaller than the screw pitch of the threaded bore (10') of the expander core (10), and wherein the blocking element (71b) comprises, at its end opposite the threaded rod (71a), a radially projecting collar (72) adapted to come into abutment on the end of said casing (4), said obturating device (71) further comprising means (73') for fixing a tool for axial extension of said threaded rod (71a), during the screwing thereof, into said threaded bore (10') of said core (10).

12. Obturating device according to claim 1, wherein the element for blocking said threaded rod (81a) comprises:
(a) an end part (81b) of said threaded rod (81a) in which there is machined a cavity (83) for a tool for screwing and unscrewing said threaded rod (81a) and which is extended axially by a deformable thin ferrule (84); and
(b) a nut (82) having a threaded external surface adapted to be screwed into a threaded bore (7) of said casing (4) of the plug constituting the end part of said bore of said casing (4) opposite said base (5), an internal bore having a diameter greater than a diameter of said end part (81b) of said rod (81a), a supporting collar (86) on an end of said casing (4) opposite said base (5) and at least one crimping internal recess (85) projecting radially towards the exterior in relation to an internal bore of said nut (82), in its part traversing said collar (86), screw pitches of said threaded rod (81a) and of said nut (82) being different and said nut (82) being screwed into said threaded bore (7) after screwing of said threaded rod (81a) into said threaded bore (10') of said core (10), in such a manner that the end part (81b) of said threaded rod (81a) is introduced into the internal bore of said nut (82) by pushing-back of said ferrule (84) into said internal recess (85).

13. Device according to claim 1, wherein said threaded rod (105, 105') has at least one transverse orifice (112, 120, 121) perpendicular to its axis (111) and opening out at either side of said rod (105, 105') and in which is engaged a braking piece (115, 122, 123) which comes into contact by means of end parts with flights of the internally threaded hole (103') of said core (103) during screwing of said threaded rod (105, 105') into said core (103).

14. Device according to claim 13, wherein said orifice (112, 120, 121) has an axial direction corresponding to a diameter of the cross-section of said rod (105, 105').

15. Device according to claim 13, wherein said orifice (112, 120, 121) and the corresponding braking piece (115, 122, 123) have circular cross-sections.

16. Device according to claim 13, wherein said braking piece (115, 122, 123) is made of a material having a hardness substantially lower than a hardness of material forming said core (103).

17. Device according to claim 13, wherein said braking piece (115, 122, 123), in its axial direction corresponding to an axial direction of said orifice (112, 120, 121) of said rod (105, 105') is longer than the thread-bottom diameter of said threaded rod (105, 105').

18. Device according to claim 13, wherein said rod (105') has two successive orifices (120, 121) which are spaced in an axial direction of said rod and in each of which orifices a corresponding braking piece (122, 123) is engaged.

19. Device according to claim 18, wherein said braking piece (122) engaged in an orifice (120) of said rod (105') located nearest to an end of said rod adjacent a bottom (102) of said plug is shorter than said braking piece (123) engaged in the orifice (121) located nearest to an end of said rod (105') integral with its widened part (106, 107) engaged for fastening said rod (105') in the orifice of said casing (101).

* * * * *